INVENTOR
Hubert G. Lesley

BY  *Newton, Hopkins, Jones & Ormsby*

ATTORNEY

INVENTOR
Hubert G. Lesley

United States Patent Office 3,366,997
Patented Feb. 6, 1968

3,366,997
ADJUSTABLE TIE DOWN DEVICE
Hubert G. Lesley, % The Aid Corp.,
Clayton, Ga. 30525
Continuation of application Ser. No. 518,185, Jan. 3, 1966. This application May 11, 1967, Ser. No. 637,854
5 Claims. (Cl. 24—68)

ABSTRACT OF THE DISCLOSURE

An adjustable tie down device for releasably securing cargo on a supporting surface comprising a tubular block having a hook adjustably threaded into one of its ends and a chain gripping member connected to the other of its ends and moveable in an axial direction with respect to the tubular block. A lever is pivotally connected to the tubular block and is pivotal to a position adjacent the tubular block to restrain the adjustment of the hook with respect to the tubular block and to retain the chain gripping member adjacent the tubular block.

---

This is a continuation of my application Ser. No. 518,185, filed Jan. 3, 1966, and now abandoned.

In the past, many tie-down blocks have been devised for securing a line to another object and for quickly releasing the line when desired. U.S. Patent No. 3,142,877 discloses a construction for such a tie-down block, which is somewhat similar to the instant invention.

Other prior art devices, however, have certain disadvantages which the present invention attempts to overcome. One of the major disadvantages of certain prior art devices is that, when utilized with a chain or a line to secure one end of the chain in place, the device is, almost invariably, in a condition of tension and is so constructed that, under a condition of tension, the end of the chain must be moved in an arcuate path when the end is released; thus, a lateral force is imparted to the relatively heavy chain which may hurl the released end in one lateral direction as the tie-down device strikes a person or object adjacent thereto, the person may be injured or the object damaged.

Briefly, to overcome this disadvantage and yet provide a simple but effective tensioning device, the instant invention is one in which the tension is released essentially in an axial direction with respect to the end of the chain or line, thereby imparting essentially no sidewise movement to the chain or line, or tensioning device. In general terms, the present invention includes in a stamped metal, tubular block or body, having at one end a line engaging or retaining member for engaging and holding the end of a chain, cable, strap, line or the like. The other end of the body is provided with an adjustable fastening means, the effective length of which may be varied as desired when the tie is not connected to the end of a chain, and only contracted when the tie down is connected to the end of a chain. Between the retaining member and the body is an extensible toggle member which includes a lever pivotally secured by one end to the body and a link pivotally secured to the lever at an intermediate position and connected to the retaining member. The body is also provided with a readily releasable detent member which engages the end of the lever for locking the toggle connection in its retracted position.

Accordingly, it is an object of the present invention to provide, in a tensioning device, a quick release mechanism which will release the tension thereon, in generally an axial direction, and which is adjustable in length only in one direction when connected at one end to a chain, and adjustable in both directions when not connected.

Another object of the present invention is to provide a tensioning device which is inexpensive to manufacture, durable in structure, efficient in operation, and which will accept chains of various dimensions.

Another object of the present invention is to provide a tensioning device which will transmit relatively heavy loads and yet is readily and quickly adjusted for varying the tension between the end of a chain and a securing member and is readily, easily and quickly released.

Another object of the present invention is to provide a tensioning device which cannot readily be inadvertently released.

Another object of the present invention is to provide a tensioning device which is relatively light in weight, has few moving parts, and has a body which may be formed by stamping.

Other objects, features, and advantages of the present invention will become apparent from the following description when taken in conjunction with the accompanying drawings, wherein like characters of reference designate corresponding parts throughout the several views and wherein.

Referring now in detail to the embodiment chosen for the purpose of illustrating the present invention, it being understood that, in its broader aspects, the present invention is not limited to the exact details herein depicted, the body of the tensioning device includes a pair of spaced opposed complementary body members denoted generally by numerals 11 and 12. The body members 11 and 12 are formed from flat plates of metal, preferably aluminum, the central and lower portions of which are curved inwardly toward each other to provide opposed shaft housing members 13 and 14.

Figures 1, 2, 3:
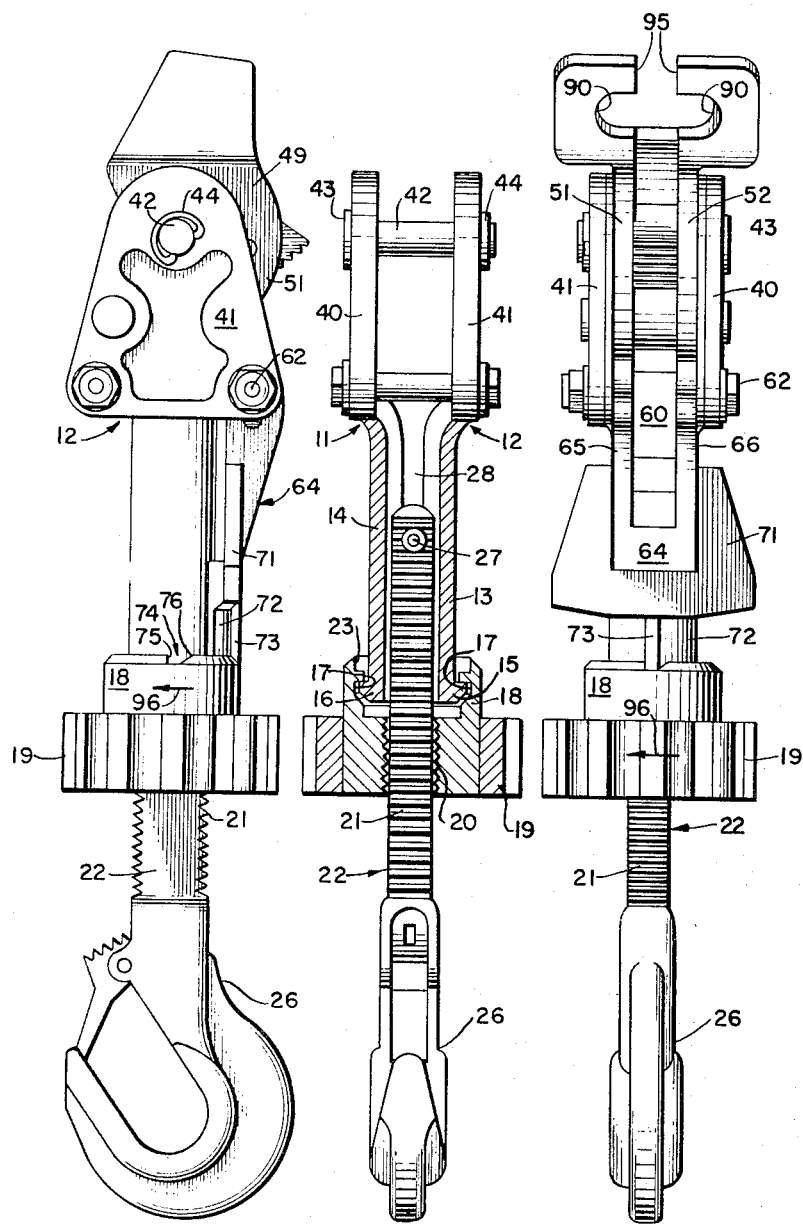
FIG. 1 is a side elevational view of a tensioning device constructed in accordance with the present invention.
FIG. 2 is a rear elevational view, partially in cross section, of the tensioning device as shown in FIG. 1.
FIG. 3 is a front elevational view of the tensioning device shown in FIG. 1.

The lower ends of housing members 13 and 14 are belled out, as seen in FIG. 2, to provide outwardly protruding shoulder flanges 15 and 16, respectively, for being received in an annular groove 17 along the inner periphery of a rotatable collar 18. The collar 18 is also provided with an annular groove 23 at its upper periphery.

Integrally joined to the lower surface of collar 18 is a rotatable ring 19 of substantially larger diameter than the collar 18. The collar 18 is provided with internal threads 20 which receive the external threads 21 of a take-up or tensioning rod or shaft 22. As best seen in FIGS. 1–3, the lower end of shaft 22 carries a hook 26, by means of which the lower end of the tensioning device may be anchored to a supporting structure (not shown).

The shaft 22 is provided with the threads 21 throughout substantially its entire central and upper portions, there being provided a transverse pin 27 at the upper end portion of shaft 22. The pin 27, as seen in FIG. 2, protrudes outwardly on opposite sides of shaft 22 so as to ride, at all times in a pair of diametrically opposed, axial slots 28 defined by the opposed edges of housing members 13 and 14.

The shoulder flanges 15 and 16 are less wide than the inside diameter of collar 18 and hence, by arranging the housing members 13 and 14 together, the lower end may be inserted through and into the collar 18. Thereafter, the end of shaft 22 is threaded into the ring 19 and, with continued manipulation of ring 19, the shaft passed between the housing members 13 and 14, urging them apart sufficiently that the flanges 15 and 16 are confined in groove 17.

When pin 27 is installed radially in the end portion of shaft 22, it is sufficiently long that it limits the outward or downward movement of shaft 22 by engaging collar 18.

The upper end portions of the body members 11 and 12 are flat and esesntially triangular in shape, thereby providing a pair of spaced, opposed parallel plates 40 and 41 which support, toward their upper ends, a central, transversely extending trunnion or pivot pin 42. Pivot pin 42 protrudes through a pair of aligned holes in plates 40 and 41, one end of pin 42 being provided with a flat head 43 and the other end being provided with a retaining clip 44, engaging an annular groove near the end of the pivot pin 42.

Figures 4, 5:
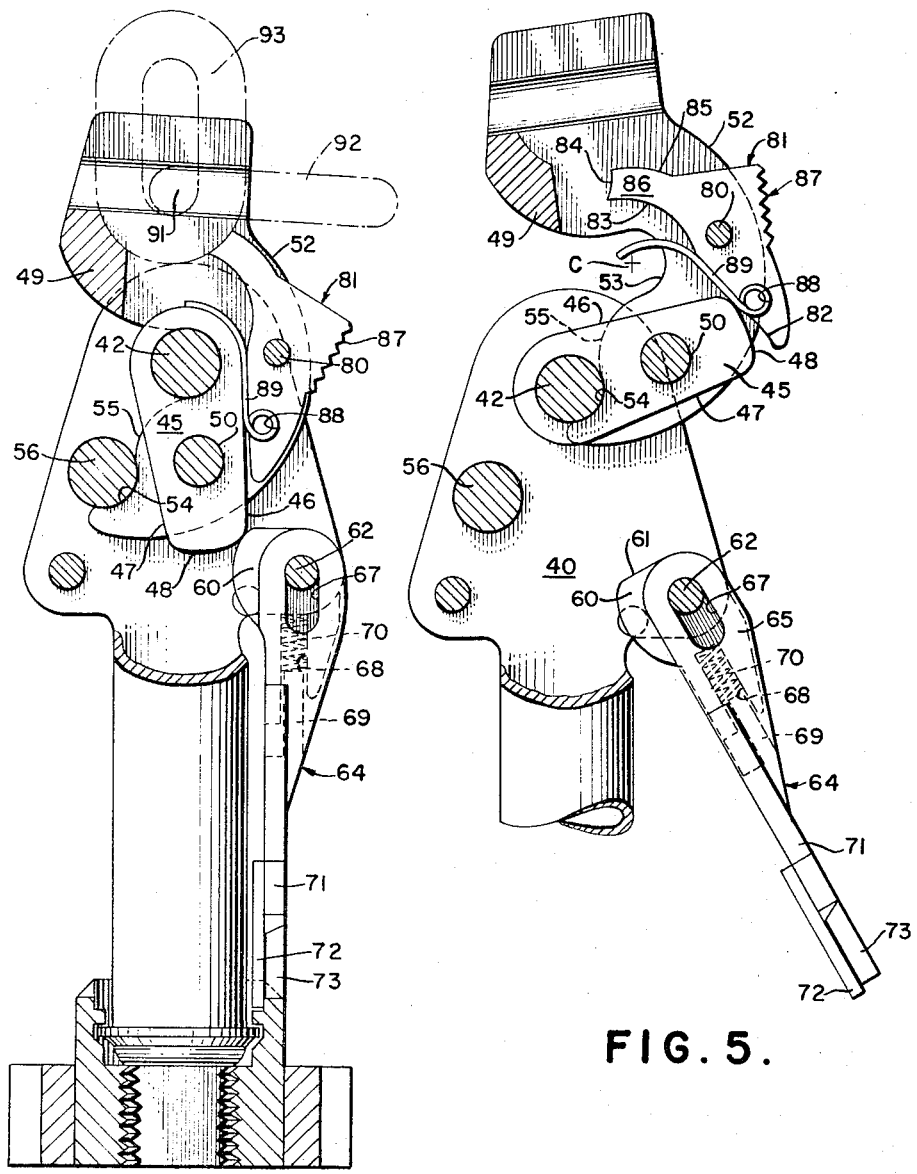
FIG. 4 is an enlarged elevational view, partially in cross section, of a portion of the tensioning device shown in FIG. 1, the release mechanism being shown in its retracted, locked condition.
FIG. 5 is an enlarged elevational view, partially in cross section, of a portion of the tensioning device shown in FIG. 1, the release mechanism being shown in its unlocked, extended condition.

The central portion of pin 42 carries a lever 45 pivotally mounted by one end of lever 45. The lever 45 is flat and, as shown in FIGS. 4 and 5, has tapered forward and trailing surfaces 46 and 47 respectively, which merge with a rounded outer end 48.

Intermediate the ends of lever 45, there is a transverse link carrying pin 50 which is fixedly secured to the lever 45 and protrudes outwardly on both sides of lever 45. The pin 50 pivotally receives on opposite sides of the lever 45 a pair of complementary parallel C-shaped arms 51 and 52. A cross bar 49, extending between the upper end portions of arms 51 and 52, rigidly secures the arms 51 and 52 together.

The configuration of arms 51 and 52 is significant in that the distance from the center of curvature C (FIG. 5) of the arms 51 and 52, to the center of pin 50 is approximately equal to the distance from the center of pin 42 to the center of pin 50; also, the radius of the curvature of the inner edge portions, such as the central concaved, inner edge portion 53 of the arms 51 and 52 is slightly greater than the diameter of pin 42. Hence, when lever 45 is pivoted to a retracted position, as shown in FIG. 4, the arms 51 and 52 rest against and partially encompass the pin 42.

The inner or lower end of the arms 51 and 52 each have a secondary concaved inner edge portion, such as edge portion 54, the outer edge of which merges, along a convex portion 55, with the central or primary inner edge portion 53. The curvature of edge portion 54 corresponds to the diameter of pin 42 while the convex portion 55 is concentric with pin 50. Therefore, when the lever 45 is in its extended position, as shown in FIG. 5, the edge portion 54 comes to rest against the pin 42, whereby the upward, i.e. outward, movement of the upper ends of arms 51 and 52 is arrested. On the other hand, when lever 45 is in its retracted position, as shown in FIG. 4, the edge portion 54 comes to rest against a pin 56 carried by plates 40 and 41 in parallel relationship to the pin 42. It will be observed in FIGS. 4 and 5 that the pin 56 is on one side of the axis or centerline of body members 11 and 12 and is so dimensioned that when lever 45 is in its most retracted position, the lever 45 extends inwardly on the opposite side of the axis. Also, in the retracted position of lever 45, the center of the pivot pin 50 is only slightly on the opposite side of the axis from pin 42. For arresting or locking the lever 45 in place in a retracted position, there is a detent disposed between the plates 40 and 41. The detent includes a cam 60 having a flatended outer side 61 which is pivotally carried by a pin 62 between the plates 40 and 41. The cam 60 is so arranged that, in one angular position thereof, as shown in FIG. 4, the protruding inner edge 63 of cam 60 protrudes into the arcuate path of the end of lever 45, so as to lock the same in its retracted position. However, when cam 60 is rotated so that the flattened portion 61 is arranged facing the path of travel of lever 45, the lever may freely pass by the cam 60, as illustrated in FIG. 5.

For controlling the pivoting of cam 60, I have provided a control lever 64 having a pair of spaced flat parallel legs 65 and 66 which straddle a portion of the cam 60. The legs 65 and 66 are provided with elongated slots, such as slot 67, through which pin 62 projects. The cam 60 is provided with an axial slot 68 which receives a web 69 extending between the legs 65 and 66, the web being urged outwardly by a spring 70 in slot 68. Therefore, the control lever 64 may be urged against spring compression inwardly in a radial direction with respect to pin 62 and when released, the lever 64 is urged outwardly by spring 70, the outward movement being limited by the upper ends of slots, such as slot 67.

At the free end of control lever 64, there is a wide flat plate 71 which has an arcuate lower portion 72 and a finger-like projection 73 extending outwardly therefrom. The arcuate lower portion 72 is shaped to conform with the surface of the housing members 13 and 14 and slide between the housing members and the collar 18 in its annular groove 23. The collar 18 has a series of detents 74 in its upper annular periphery, each detent having one side 75 parallel to the axis of rotation of the collar and another side 76 set at an angle with the axis of rotation. The finger 73 is slightly displaced from the end of the arcuate portion 72 of the plate 71 so that the arcuate portion, under the bias of spring 70, will be urged into the annular groove 23 of the collar 18 while the finger 73 will rest on either the upper periphery of the collar 18 or in one of the detents 74.

Upon urging of the lever 64 against spring 70, the plate 71 may be freed for pivoting of the cam 60 to the release position shown in FIG. 5.

Between the central portion of the arms 51 and 52 is a pivot pin 80 which pivotally carries a chain retaining lug 81. The lug 81 is somewhat triangular with the lower portion of its hypotenuse surface 82 facing the lever 45, in close proximity to the surface 46 thereof. Thus, as lever 45 pivots outwardly, the edge 46 and the corner defined by edges 46 and 48 act as a cam to pivot the lower portion of the lug 81 outwardly. Toward its upper end, the surface 82 curves inwardly to provide a concaved portion 83. Thence, the perimeter of lug 83 extends abruptly in a radial direction with respect to the concaved portion 83 to form surface 84 which intersects the surface 85, thereby forming a protruding finger 86. Surface 85 extends outwardly of the plates 40 and 41 and intersects the outer edge of lug 81 to provide a serrated surface 87 by means of which the lug 81 may be pivoted manually.

Along surface 82, there is a recess 88 which receives one end of a leaf spring 89 which extends outwardly and around the pivoted end of lever 45, when the lever 45 is retracted. Spring 89 yieldably urges the lug 81 into the latching position, as shown in FIG. 4; however, when pressure is exerted on the serrated surface 87, the lug 81 may be pivoted inwardly when lever 45 is in its retracted position.

The upper end portions of arms 51 and 52 are recessed to form a retaining member having transversely aligned sidewise opening slots 90 which extend the entire length of the arms 51 and 52. The slots 90 are shaped to receive therebetween a chain link 92 in the position shown in FIG. 4, whereby its end portion 91 acts as a transverse support for the interengaged adjacent link 93 which extends outward between the upper or outer ends of arms 51 and 52.

The slot 90 and lug 81 are so dimensioned that when lug 81 is in its latching position, as seen in FIG. 4, the chain link 92 may be urged into the slots 90, the chain link 93 acting against edge 85 which is inclined toward the slots, so as to pivot the lug 81 sufficiently for the link 92 to be received in the position shown in FIG. 4, whereupon the lug 81 is urged by spring 89 to its latching position so that the surface 84 of the finger 86 blocks the removal of link 92 therefrom.

When the lever 45 is moved to its extended position, as shown in FIG. 5, the rotation of the lever 45 engages the surface 82 below the pivot pin 80 which pivots the lug 81 sufficiently for the finger 86 to disengage the chain link 92 and for the chain link 92 to be freed for ready removal.

*Operation*

In operation, the hook 26 is placed in a tie-down ring (not shown) of a supporting surface, such as a floor, and the link 92 is placed between the arms 51 and 52, in the slots 90, as described above, the levers 45 and 64 being in the position shown in FIG. 4. Thereafter, the tension on the chain is adjusted by manipulation of the ring 19, to thereby vary the effective length of the tensioning device.

It will be observed that the tensioning device is essentially aligned with respect to the chain, i.e., chain link 93, which it receives; therefore, the aligned slots 90 extend at a slight obtuse angle with respect to chain link 93, thereby insuring that link 92 is urged inwardly between the slots 90 when tension is applied.

When tension is applied by the tensioning device between chain link 93 and to the tie-down ring (not shown), it is applied along the axis or longitudinal center line of the tensioning device, and, therefore, when the tension is released by outward or sidewise movement of the toggle member, i.e., lever 45 and arms 51 and 52, essentially no sidewise force is applied to the chain link 93. Instead, the arms 51 and 52 tend to pivot about the link portion 91 as this link portion 91 remains essentially in the center line or longitudinal axis. Likewise, no appreciable sidewise reactive force is applied to the tensioning device which will tend to urge its sidewise. Hence, there is little danger of a person being injured when the tensioning device is released.

When it is desired to release the chain link 93, the flat plate 71 is grasped by the operator and urged upwardly and the arcuate portion 72 is withdrawn from the annular groove 23, whereupon the lever is pulled outwardly, away from the body members 11 and 12. In this position the flattened portion 61 of cam 60 is pivoted toward the lever 45, whereby the cam 60 releases lever 45 to swing outwardly in an arcuate path, lengthening the effective length while simultaneously acting against the lug 81 to cause the retracting of corner 86 and hence the unlocking of chain link 92 so that it may be removed.

When the tensioning device is in its retracted position, the angle subtended between a line from pivot pin 50 to pin 42 and a line from the end portion 91 of chain 92 through pin 42 is slightly less than 180°, there is a slight opening force applied the lever 45 outwardly.

When the tensioning device is released, the movement in an arcuate path of pivot pin 50 by the lever 45 tends to move the lower portions of arms 51 and 52 outwardly as the slots 90 remain essentially on the main axis, whereby end portion 91 of chain 92 remains essentially on the axis of the tensioning device, with the arms 51 and 52 pivoting thereabout. The moving of the arms 51 and 52, as described, increase the effective length of the tensioning device sufficiently for the chain link 92 to be removed, with little effort, from the slot 90.

The slots 90 of the arms 51 and 52, together with the separation of the upper portions 95 of the arms 51 and 52, form an area whereby chain links 92 of varying sizes can be inserted, and the lug 81 projects high enough between the arms 51 and 52 to retain links 93 of varying sizes. For instance, while the link 92 can be no larger than the slots 90, it can be of a size barely large enough to engage the upper portions 95 of the arms 51 and 52. Since the link 93 will always project downwardly of the link 92, regardless of the size of the chain utilized, the size of the chain must be large enough only for the projection of finger 86 to engage the curved end portion of the link and prevent the chain from being withdrawn from the slots 90. Thus, it can be seen that the particular configuration of the slots 90 of the arms 51 and 52 enables the operator to utilize chains of various shapes and sizes.

The fact that the lever 64 is secured by the collar 18 in its annular groove 23 causes the finger-like projection 73 to engage the upper periphery of the collar 18 and its series of detents 74 only when the lever is pivoted to its closed position. Thus, when the lever is in its closed position the ring 19 and collar 18 can be rotated only in one direction since the sides 75 of the detents 74 extend parallel to the finger-like projection 73 to prevent rotation of the ring in the other direction. Since the sides 76 of the detents 74 are disposed at an angle, the ring 19 and collar 18 can be rotated in the direction indicated by the arrow 96 (FIGS. 1 and 3) since the angled surface 76 merely pushes the finger-like projection 73 and the lever 64 upwardly against the bias of spring 70, while the arcuate portion 72 of the lever, extending beyond the finger-like projection 73, is retained in the annular groove 23 of the collar 18. Thus, it can be seen that when the operator attaches the tie-down device to a tie-down ring and a chain and the lever 64 is closed, as previously described, the ring 19 can be rotated only in the direction indicated by the arrow 96, which is the direction that causes the shaft 22 to be withdrawn in the housing members 13 and 14. Thus, the detents 74 prevent the operator from inadvertently loosening or extending the tie-down. Also, when the tie-down is subjected to continuous and extreme vibration, it can be seen that the co-action of the finger-like projection 73 with the detents 74 will not allow the ring 19 to rotate and gradually work the shaft 22 loose from the body members 13 and 14.

In the event that the operator desires to lengthen the device without operating the quick-release mechanism, the operator can grasp the flat portion 71 of the lever and urge the lever against the bias of its spring 70 so as to contract it, but hold the lever in its closed position so that the finger-like projection 73 is withdrawn from its detent 74, whereupon the ring 19 can be rotated in either direction. This, of course, allows the operator to make any fine adjustments necessary to his tie-down function, yet allows the operator to be assured that he is contracting the tie-down when he rotates the ring without lifting the lever 64.

It will be obvious to those skilled in the art that many variations may be made in the embodiments chosen for the purpose of illustrating the present invention without departing from the scope thereof as defined by the appended claims.

I claim:

1. A tensioning device comprising a hollow body portion, an internally threaded collar member rotatably connected to one end of said body portion for threadable engagement with an externally threaded member to move said externally threaded member into or out of said hollow body portion, said collar member and said hollow body portion defining an annular groove extending around said hollow body portion, a first lever member pivotally connected at the first of its ends to the other end of said hollow body portion, a connecting member connected to said first lever member whereby rotation of said first lever member moves said connecting member toward or away from said hollow body portion, a second lever member pivotally connected at one of its ends to said hollow body portion adjacent said first lever member, said second lever member including an engaging surface movable to a position to engage said first lever member to retain said first lever in a position where said connecting member is positioned closely adjacent said hollow body portion, said second lever member including an extension constructed and arranged to be received within said annular groove of the collar member, biasing means for urging said extension into said annular groove, said extension and said collar member including means for limiting the rotation of said collar in one direction when said extension is received in said annular groove.

2. In tensioning device for applying tension to a line, pair of opposed elongated body members formed of sheet metal for defining a shaft receiving zone, said body members being curved inwardly adjacent said shaft receiving zone and having opposed straight edges, said body members being normally spaced apart sufficiently to provide an axial slot between said opposed edges, flange means extending from said body members adjacent said shaft receiving zone, a rotatable ring having a continuous groove along its inner periphery, said flange means being received in said groove, said ring being provided with internal threads inwardly of said groove, a shaft having external threads threadedly received by said internal threads, one end of said shaft protruding into said shaft receiving zone and being of sufficient diameter that said flanges are retained by said groove so long as said shaft is within said shaft receiving zone, means extending from said shaft into said slot for preventing rotation of said shaft with respect to said body members, and means on said ring for selectively preventing rotational movement of said ring in at least one direction.

3. A tensioning device for applying tension to a chain comprising a body having pair of opposed elongated body members formed of sheet metal for defining at one end portion of said body a shaft receiving zone and at the other end portion of said body a toggle member receiving zone, said body members being curved inwardly adjacent said shaft receiving zone and being essentially flat and parallel adjacent said toggle member receiving zone, a pair of opposed outwardly protruding flanges extending radially from said body members adjacent said shaft receiving zone, a rotatable ring having a continuous groove along its inner periphery, said flanges being received in said groove, said ring being provided with internal threads inwardly of said groove, a shaft having external threads threadedly received by said internal threads, one end of said shaft protruding into said shaft receiving zone, a hook on the other end of said shaft, a plurality of pins extending between the flat portions of said body members, a first lever member pivotally carried by one of said pins for pivoting into a retracted position, said first lever member being pivotable sidewise from its retracted position to an extended position, a pair of complementary C-shaped arms having concaved central portions pivotally connected by their ends to an intermediate portion of said first lever member to form with said first lever member a toggle member, the other ends of said arms being provided with opposed slots therethrough for receiving a link of a chain therein, a second lever member pivotally carried by another of said pins and pivotal to a retracted position to restrain said first lever member when said first lever member is in its retracted position, and said rotatable ring having means thereon for cooperation with said second lever member to limit the rotation of said ring when said second lever member is in its retracted position.

4. A tie-down device comprising a body portion, an externally threaded shaft received in one end of said body portion, an internally threaded ring rotatably connected to said body portion and constructed to threadably engage said shaft whereby rotation of said ring changes the effective length of said device, a first lever member pivotally connected to said body portion at its end remote from said one end and being pivotal between an extended position and a retracted position with respect to said body, a holding member having means defining a slot therethrough at one of its ends, said holding member being pivotally connected at its end remote from said slot to an intermediate portion of said first lever member to form with said first lever member a toggle member, a second lever member pivotally connected to said body portion to a retracted position to engage said first lever member and retain said first lever member in its retracted position, said ring having means thereon for confining said first lever member in its retracted position.

5. In a tensioning device of the type wherein a body receives at one end a rod, the effective length of which may be varied and having in combination therewith
    a first lever pivotally mounted at the other end of said body;
    line retaining means connected to said first lever and effective to be moved with respect to said body as said first lever is pivoted; and
    detent means carried by said body for confining said first lever in a retracted position, the combination therewith of
        collar means adjustably connecting said body and said rod; and
        second lever means connected to said detent means for movement of said detent means,
        said collar means having confining means for retaining said second lever means in a retracted position.

References Cited
UNITED STATES PATENTS

| | | | |
|---|---|---|---|
| 2,866,244 | 12/1958 | Cobin | 24—68 |
| 2,935,300 | 5/1960 | Elsner | 24—68 X |
| 3,027,614 | 4/1962 | Davis | 24—116 |
| 3,142,877 | 8/1964 | Lesley | 24—68 |

MILTON S. MEHR, *Primary Examiner.*